United States Patent
Gabrielson

(10) Patent No.: US 8,583,913 B1
(45) Date of Patent: Nov. 12, 2013

(54) SECURELY DETERMINING INTERNET CONNECTIVITY BETWEEN NETWORKS

(75) Inventor: Jacob Gabrielson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 70 days.

(21) Appl. No.: 13/232,880

(22) Filed: Sep. 14, 2011

(51) Int. Cl.
*H04L 29/06* (2006.01)

(52) U.S. Cl.
USPC .......... 713/153; 713/150; 713/161; 713/168; 713/176; 713/185; 709/223; 709/224; 709/225; 709/219; 709/229; 455/445; 455/403; 726/1; 726/10; 726/11; 726/12; 726/16; 726/27; 726/28; 726/29; 726/30

(58) Field of Classification Search
USPC .......................................................... 713/176
See application file for complete search history.

(56) References Cited

U.S. PATENT DOCUMENTS

| 7,024,199 | B1 * | 4/2006 | Massie et al. ................. 455/445 |
| 7,036,143 | B1 * | 4/2006 | Leung et al. .................... 726/15 |
| 7,359,933 | B1 * | 4/2008 | Polen et al. .................. 709/203 |
| 2003/0134642 | A1 * | 7/2003 | Kostic et al. ................. 455/450 |
| 2011/0258695 | A1 * | 10/2011 | Barrett ........................... 726/13 |

* cited by examiner

*Primary Examiner* — Nathan Flynn
*Assistant Examiner* — Bryan Wright
(74) *Attorney, Agent, or Firm* — Kilpatrick, Townsend & Stockton, LLP

(57) ABSTRACT

External network connectivity of an internal host can be measured by giving an external computer a payload identifying the internal host and instructions to deliver the payload to an external host. The external host may receive the payload and contact the internal host. The internal host's response and receipt of the payload may then determine the Internet connectivity of the internal host. The path from the computer through the trusted host to the internal server shows external network connectivity without exposing the internal host to the external network directly.

23 Claims, 10 Drawing Sheets

```
Web Browser                                              _ □ ×
FILE  EDIT  VIEW  FAVORITES  TOOLS  HELP
Address www.search.example.com                           ▽ ⇥ GO
   Search.Example.com      [ Coffee machine ]    [ Refine Search ]
```

| Department | 804 | PING |
|---|---|---|
| Kitchen & Dining | | LOGO |

"coffee maker"                                     810 →

Drip Coffee Machines
Single-Serve Brewers     Similar Searches:  coffee machine, espresso maker
Coffee, Tea & Espresso   Showing First 10 of 253 Results
Grocery
Coffee pods
+See All 28 Departments   1.      EuroCoffee 314 DR Coffee Machine
                                                     $79.99
☐ FreeQuickShip                                      QuickShip Available
                    806                              ★★★★☆ (3141 Reviews)

Brand
  Any Brand            2.      EuroCoffee 13ES Espresso Machine
☐ Acme (17)                                          $179.99
☐ Ace (13)                                           QuickShip Available
☐ CoffeCo (23)                                       ★★★★☆ (141 Reviews)
☐ EspressoCo (2)
☐ EuroCoffee (31)     3.      ACME Brewer Coffee Machine
  +More Brands                                       $149.99
                                                     QuickShip Available
Features                                         ★★★★☆ (123 Reviews)
☐ Automatic (156)
☐ Glass (145)
☐ Timer (44)          4.      ACME Express w/ Thermal Carafe
☐ Digital (18)                                       $44.99
☐ Single Serving (16)                                (Sold by ThirdParty Co.)
  +More Features                                     ★★★☆☆ (31 Reviews)

Color
                      5.      EuroCoffee "One" Espresso Maker
  [ (SS) ] [ (Red) ]                                 $19.99
                                                     QuickShip Available
  [ (Black) ] [ (White) ]                            ★★★★★ (437 Reviews)

[ (Blue) ]          6.      EuroCoffee 314 SR Coffee Machine
Price                                            $89.99
  Under $25 (23)                                     (Sold by ThirdParty Co.)
  $25-$50 (37)                                       ★★★★☆ (1234 Reviews)
  $50-$100 (41)

SECURELY DETERMINING INTERNET CONNECTIVITY BETWEEN NETWORKS

BACKGROUND

As an increasing amount of processing and data transfer is being performed over networks such as the Internet, it is desirable to be able to accurately monitor information about the servers or resources performing such operations. In many cases, however, this information is difficult to obtain due to obstacles that affect the flow of certain types of network traffic. For example, information about network connectivity of various servers can be difficult to determine as obstacles can prevent unauthorized traffic from entering networks or seeking specific servers. One such obstacle is a firewall that can ensure that only certain types of traffic reach a particular Web server in order to filter out malicious traffic. In another example, a load balancer may choose the server to which a proper request is routed, while other requests are ignored. These gateways typically exist to protect internal servers from external attacks.

There may in some instances exist a barrier of trust between the Internet, or other external networks, and one or more internal networks. Internal computers and networks may be viewed as trusted because the internal servers are known and administered by an internal administrator. Computers on the Internet, however, may not be trusted because the computer and/or networks may not be known. As Internet connectivity may be routed through untrusted computers, measuring Internet connectivity to an internal server may be difficult because of the barriers encountered. While various techniques have been employed to effectively test Internet connectivity, due to the complexity of the tasks, the employed techniques are of varied success.

BRIEF DESCRIPTION OF THE DRAWINGS

FIG. 8 shows an illustrative example of a web page that includes secure Internet connectivity testing in accordance with at least one embodiment;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for securely determining inter-network connectivity of one or more resources, such as an application server, in a trusted environment without exposing the resource(s) directly to an untrusted environment. For example, the trusted environment may be a data center and the untrusted environment may include the Internet. A trusted computer system in the data center may cause an untrusted computer on the Internet to contact a member of a proxy fleet with both untrusted Internet and trusted data center connectivity. The member of the proxy fleet may then contact the internal server to measure connectivity. By relaying a message between the untrusted computer through the member of the proxy fleet to the internal server, a path can be created between an Internet connected computer and the internal server that enables the proxy fleet to relay the message without directly exposing the internal server exposed to untrusted computers or other components in the untrusted environment.

As the internal configuration of a data center may include sensitive information, it can be desirable to protect information about the internal portion of the message route. For example, a trusted computing device may send a message to an untrusted computing device with insecure instructions and a secure payload. The insecure instructions may be enough to cause the untrusted computing device to contact the proxy fleet and deliver the secure payload. However, the secure payload may be protected from the understanding of untrusted computing devices. After receipt by the proxy fleet, the secure payload may be decoded such that the proxy fleet may complete the task of contacting a destination, such as an internal server. In one embodiment, the secure instructions are encrypted upon message creation and decrypted by the proxy fleet. In another embodiment, the secure payload is a token that allows the proxy fleet to look up and identify the internal server to contact.

Figure 1:
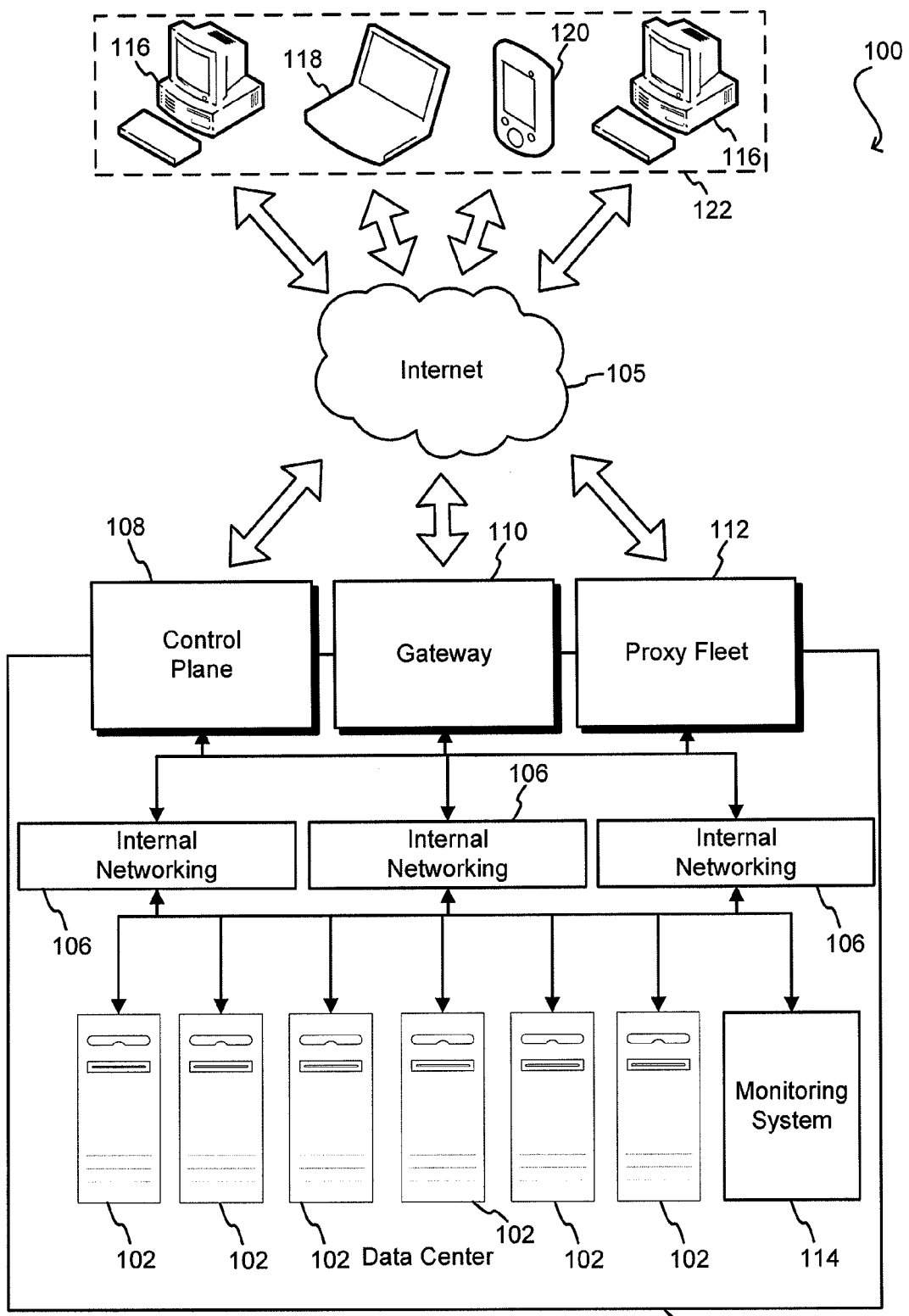
FIG. 1 shows an illustrative example of an Internet environment in accordance with at least one embodiment.

FIG. 1 shows an illustrative example of an environment 100 in which Internet connectivity of an internal server 102 within a data center 104 may be securely performed in accordance with various embodiments. The computers may be divided into trusted computers within the data center 104 and untrusted computing systems 116, 118, 120 outside the data center 104. Inside the data center 104, computing resources and networking may be under the domain and control of known administrators and thus have trusted internal connections. Outside of the data center 104 may be beyond the control of administrators, and therefore untrusted, such as the Internet 105.

Inside the data center 104 may be internal servers 102, internal networking 106, a control plane 108, a gateway 110, a proxy fleet 112 and a monitoring system 114. An internal server 102 may be connected to other internal servers 102 through internal networking 106. The internal servers 102 may also be connected with a control plane 108. The control plane 108 may receive requests to manipulate computing resources, including provisioning resources and changing routing. The internal servers 102 may also be connected with a gateway 110. The gateway 110 may filter and route untrusted traffic to internal servers 102, such as HTTP traffic to Web servers. A proxy fleet 112 may also be connected with internal servers 102. The proxy fleet 112 may aid in determining Internet connectivity of internal servers 102 as further described below. The monitoring system 114 may receive and report information about the status of computing resources in the data center 104, such as information about internal servers 102.

Outside the data center 104 may be any of a number of different components or environments, as may include the Internet 105 and various untrusted computing systems 116, 118, 120, as may include desktops 116, laptops 118 and mobile devices 120, such as electronic book readers, mobile phones, tablet computing devices, etc. When enlisted to help securely determine Internet connectivity, these untrusted computing systems 116, 118, 120 may be referred to as ping servers or collectively as a ping fleet 122. The systems 116, 118, 120 may be untrusted because the systems 116, 118, 120 may not be administered by a trusted administrator. Further, the communication channels, such as the Internet, are not controlled by a trusted administrator. Thus, a message from an untrusted computing system 116, 118, 120 may be intercepted, counterfeited and/or exploited.

In some cases, and for protective reasons, internal servers 102 on a secure internal network may only be given the Internet access required to operate, if any at all. For example, a Web server in a data center 104 may only receive outside traffic on port 80 because a gateway 110 provides access controls to the secure internal network that prevents all other Internet traffic from directly reaching the Web server. In another example, a database server on a secure internal network may not be connected to the Internet because it is only queried by a local Web server over the secure internal network. In other embodiments, an internal server 102 may be behind a load balancer, which may occasionally direct Internet requests to the internal server 102.

There may also be other reasons to prevent direct access to servers within the data center 104. Some data center operators and clients consider how the internal data center 104 operates a trade secret. Knowledge of machines, configurations or interfaces may be seen as a competitive advantage. By keeping that information only within the trusted network, the trade secrets may be kept from others. However, by preventing access to internal servers 102 within the data center 104 from outside sources, any communication to internal servers 102 must come from within. Thus, it may be difficult to reach an internal server 102 to see if it has Internet connectivity.

An advantage of the present disclosure is that an internal server 102 is not required to communicate with systems outside of the data center 104. For example, a control plane 108 may communicate with an untrusted computer 102 over the Internet 105, such as a desktop computer 116. The control plane 108 may send the desktop a message with instructions to contact a member of a proxy fleet 112 and deliver a payload identifying an internal server 102. The proxy fleet 112 may receive the payload and contact the internal server 102. Upon receiving a response or exceeding a timeout threshold, the proxy fleet 112 may report the response, or lack thereof, to a monitoring system 114. By causing a message to be effectively relayed through the proxy fleet 112, the integrity of the internal trusted network is not breached by an untrusted communication.

Figure 2:
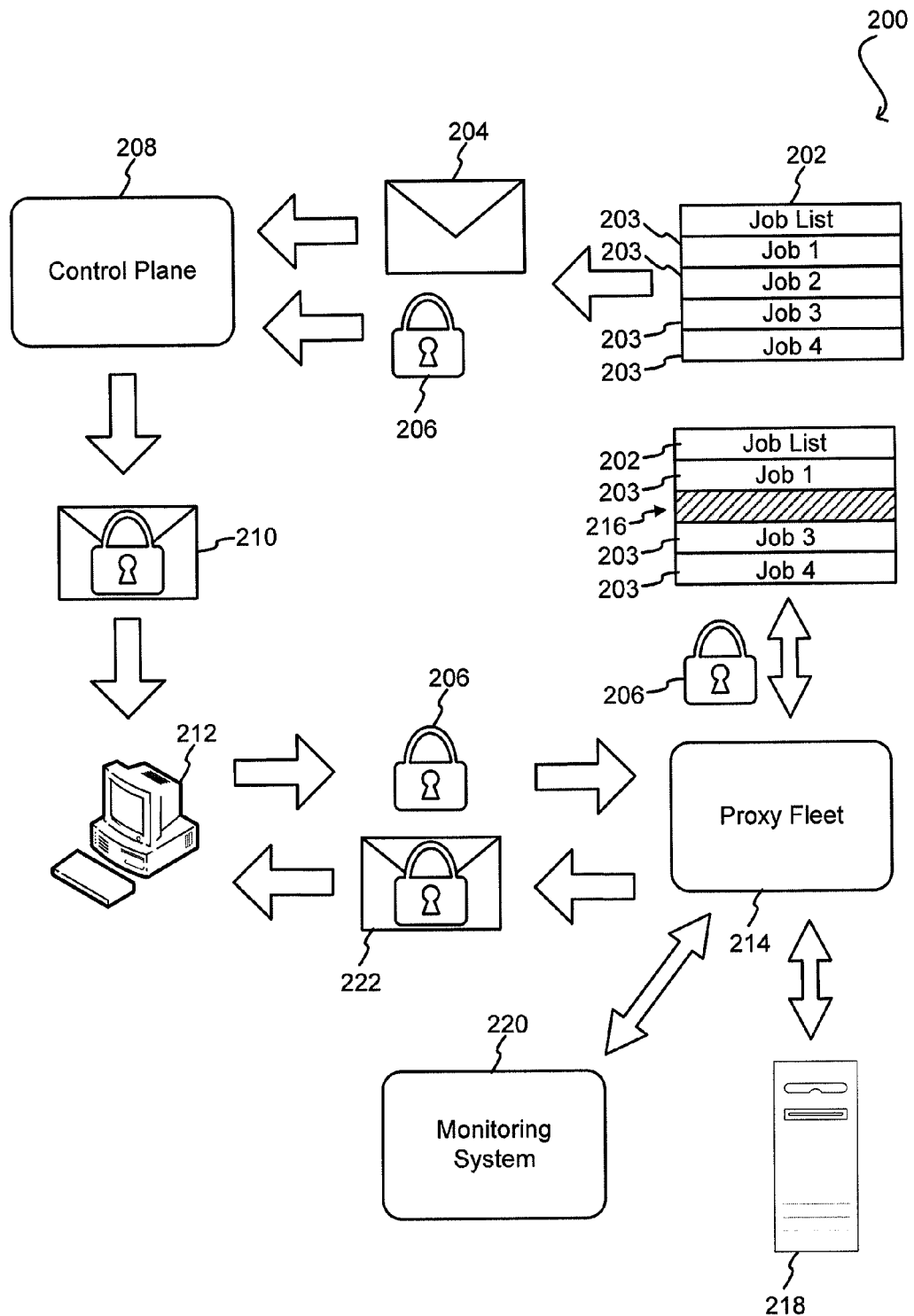
FIG. 2 shows an illustrative example of message flow in accordance with at least one embodiment.

An example of message flow may be seen in FIG. 2. In one embodiment, a data center may have an Internet connectivity measurement policy. A control plane 208 may cause a list of jobs 202 to be created, each job 203 representing the measurement of connectivity of an internal server. The list of jobs 202 may be stored in memory or in a database and shared with the proxy fleet 214. Each job 203 may be used to create an information set, such as a message 210 with untrusted instructions 204 and a secure payload 206. The untrusted instructions 204 may direct an untrusted computer 212 to contact a member of a proxy fleet 214 and deliver the secure payload 206. The secure payload 206 may identify an internal server 218 to contact.

The secure payload 206 and the associated identification information may be secured in several ways. For example, payload information may include a token, encrypted information, digitally signed information, job identification, a hostname, a server identifier, other identification, instructions or a combination thereof. Payload choice may be used to balance various needs, as may include redundancy, trust, secrecy and security. For example, by encrypting the internal server's contact information in the secure payload 206, the proxy fleet 214 may reasonably trust the secret contact information and become more robust in the case of the job list 202 going offline. The proxy fleet 214 may still use the incoming secure payload 206 to determine which internal server 218 to contact. However, while encryption may be reasonably secure, companies may not wish to transmit their data center information on the Internet. In another example, the secure payload may be a token that references a job in the job list. The job list may then be examined to determine contact information for the internal server 218. While potentially less robust, no secret information will be revealed through the disclosure of the token. In another example, trust of the secure payload may be increased by digitally signing the secure payload. Internal server 218 contact information may include IP address, MAC address, machine name and/or hostname.

In some embodiments, the payload may use multiple security features. The payload may include a timestamp, digital signature and encryption. A timestamp may be used to enforce an arrival time window by comparing a current time with a timestamp created near the time of sending a message or message creation. The digital signature may be hash of the message that verifies the integrity of the message. The payload may also be fully encrypted or have only a portion of the payload encrypted. For example, the payload may include a token in an unencrypted portion, but have a timestamp and digital signature in an encrypted portion. The payload may thus become forgery-resistant by requiring the payload to have a valid token, decrypt cleanly, verify a digital signature and arrive within a time period. In some embodiments, the information, such as the timestamp and signature is contained in the payload. In other embodiments, the timestamp and signature may reside in the proxy fleet memory or other storage.

After the message is created, the control plane 208 may send the message 210 to the untrusted computer 212, such as a home desktop. The payload 206 of the message 210 may be passed by the untrusted computer 212 to a server 218 within the proxy fleet 214. The proxy fleet 214 may match the payload 206 to a job 216 on the job list and remove the job 216 from the job list 202. Using the information about the internal server 218 identified by the payload, the proxy fleet 214 may contact the internal server 218 over the trusted internal network. Any response or lack thereof may be reported to the monitoring system 220.

In some embodiments, the proxy fleet 214 may use the job list 202 to prepare new messages 222 for untrusted computers 212 to continue testing Internet connectivity. By continuing to use willing untrusted computers 212, the system for Internet connectivity testing may become more robust. For example, if the control plane 208 goes offline, the proxy fleet 214 may continue sending out jobs on the job list 202 to returning untrusted computers 212 to continue testing Internet connectivity. By using the proxy fleet 214 to create new messages 222 the workload of the control plane 208 may be reduced.

Unauthorized messages may be trivially rejected. In one embodiment, if a payload is received that is not on the job list 202, the payload may be rejected by computing devices of the proxy fleet 214. Because jobs are removed from the job list 202 as they are processed by computing devices of the proxy fleet 214, the job list 202 may allow for trivial rejection of duplicated jobs that arrive at the proxy fleet 214. Attempts at reverse engineering the jobs may fail as well, because even a well-formed payload 206 will not likely be on the job list 202.

In other embodiments, the job list may not be used at the proxy fleet 214. Payloads 206 may simply be verified by decrypting cleanly, verifying a digital signature and/or arriving within a time period that may be enforced by comparing a current time with a timestamp. Attempts at reverse engineering the jobs may fail because of the secrecy of the keys to the encryption and signature. Secrecy of the keys may be further strengthened by rotating the keys on a frequent basis.

In some embodiments, Internet connectivity may be more deeply measured than just connected or not connected. Measurement information may include latency, hops, bandwidth, routing and transit delays. In one embodiment, the measurements may be performed four times.

A first measurement may be performed from the untrusted computer 212 to the proxy fleet 214. A second measurement may be from the proxy fleet 214 to the untrusted computer 212. A third measurement may be from the proxy fleet 214 to the internal server 218. A fourth measurement may be from the internal server 218 to the proxy fleet 214. These measurements may be performed by custom or common software, including traceroute and ping.

However, as an untrusted computer 212 may not be well known, the measurements may not be trustworthy. In one embodiment, untrusted computers 212 may gain trust by performing Internet connectivity measurements. As the untrusted computers 212 gain trust, the untrusted computers 212 may be requested to perform more advanced testing. In some cases, measurement results may be compared and trust gained by having similar results. In other embodiments, groups of measurements performed may be aggregated from untrusted computers 212 and outliers may be removed.

In another embodiment, negative actions may be tracked. The proxy fleet 214 and/or control plane 208 may keep track of rejected payloads from untrusted computers 212. For example, if an untrusted computer 212 sends more than a threshold of malformed or late jobs, the untrusted computer 212 may be given no more messages. Untrusted computers 212 that attempt contact with the proxy fleet without jobs may be blacklisted from contacting the proxy fleet 214.

Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, in hardware, or combinations thereof. The code may be stored on a computer-readable storage medium, for example, in the form of a computer program comprising a plurality of instructions executable by one or more processors. The computer-readable storage medium may be non-transitory.

Figure 3:
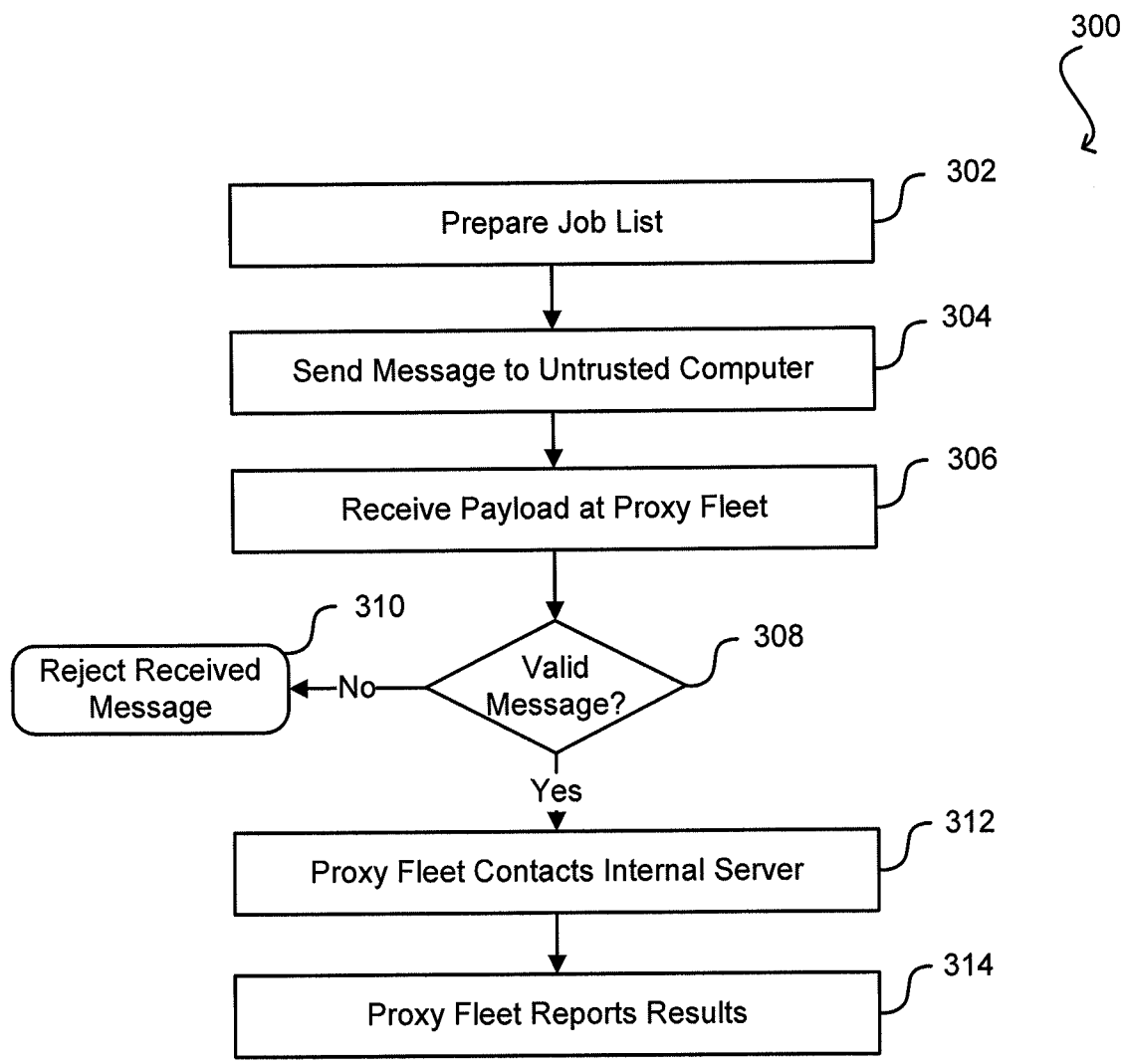
FIG. 3 shows an illustrative example of a process that may be used to securely test Internet connectivity in accordance with at least one embodiment.

In one embodiment, shown in FIG. 3, a process may be used to measure Internet connectivity. A job list may be created 302 that lists active jobs. A message may be constructed and sent 304 to an untrusted computer. The proxy fleet may receive 306 the payload from the untrusted computer. If the payload is valid 308, such as a payload matching a job in the job list, the proxy fleet may contact 312 the internal server and report 314 the results of the contact to a monitoring system. If the payload is not valid 310, the message may be rejected.

Figure 4:
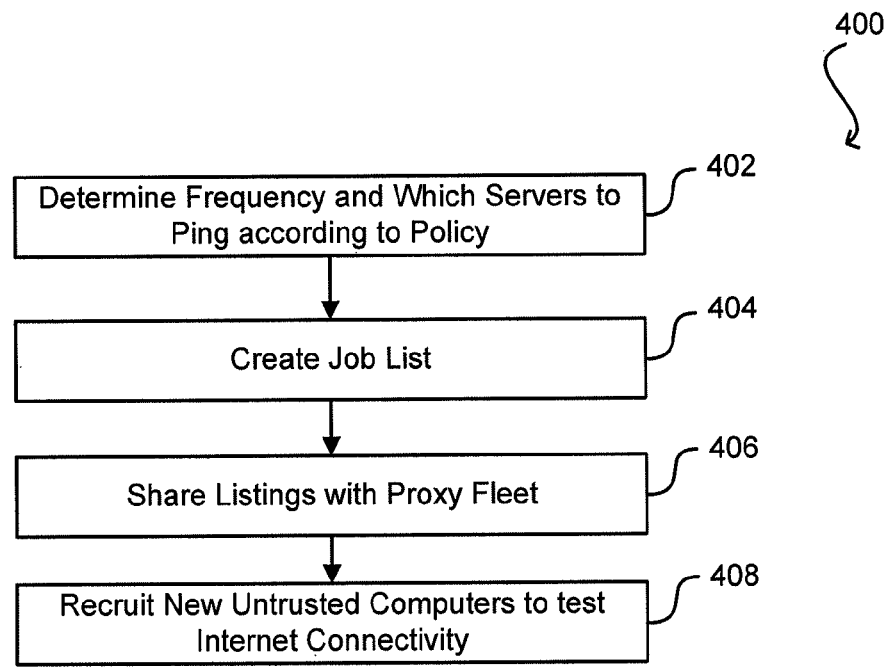
FIG. 4 shows an illustrative example of a process to prepare job listings in accordance with at least one embodiment.

In some embodiments, creating a job list may include several operations, as seen in the example of FIG. 4. A policy may be created by administrators that dictate how often and how many internal servers are measured for Internet connectivity. By applying the policy, individual servers and frequencies of testing may be identified 402. Using the identified servers and frequencies, a job list may be created 404. The job list may be shared 406 with the proxy fleet to enable the proxy fleet to aid in the identification of valid payloads. After which, new untrusted computers may be recruited 408 to perform jobs from the job list. For example, a policy may dictate that 10% of 1000 data center servers will be tested for Internet connectivity. Internet connectivity of the 100 servers may be tested once a minute such that each server will be tested once every 100 minutes. A control plane may create the job list according the dictated policy and schedule messages to be sent. The job list may be shared with the proxy fleet, such that the proxy fleet may create and receive messages and mark which messages are active or complete. After sharing the list, new untrusted computers may be recruited to perform the jobs on the job list.

Figure 5:
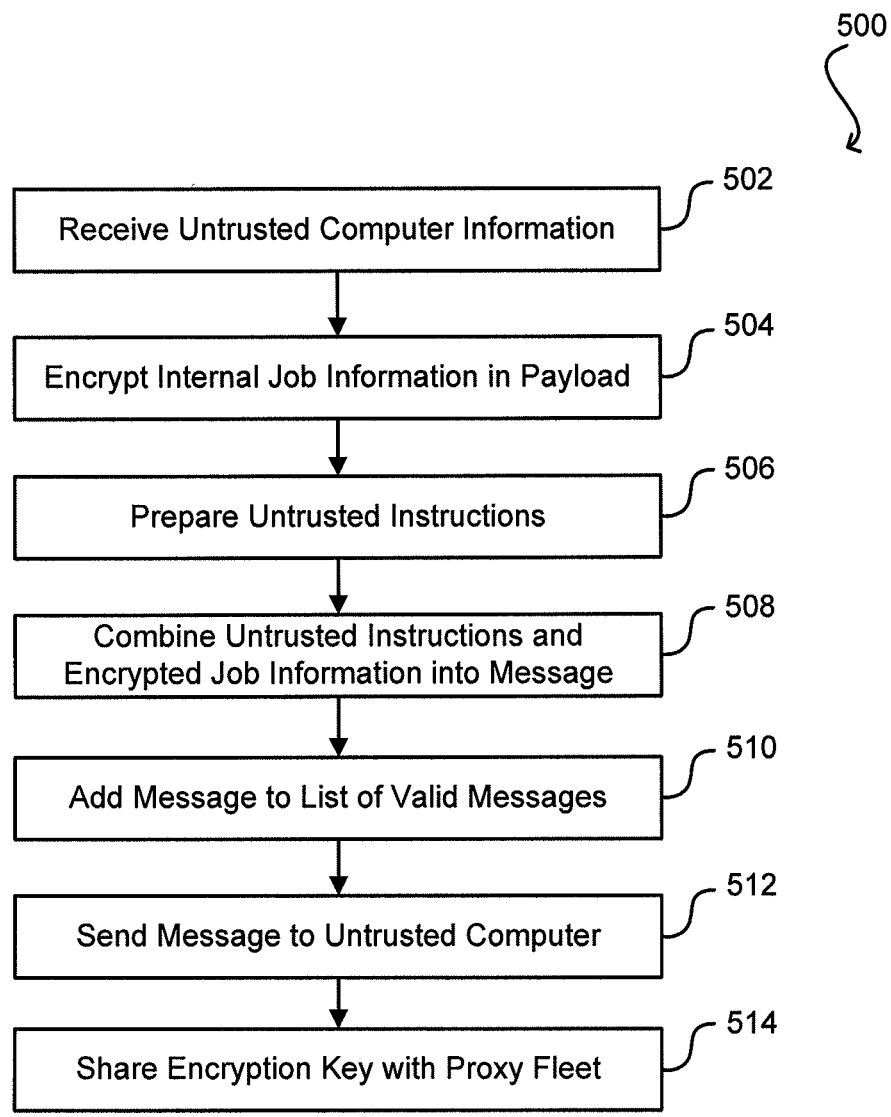
FIG. 5 shows an illustrative example of a process to prepare a job message in accordance with at least one embodiment.

Preparing the message for an untrusted computer may include further processing. In one embodiment shown in FIG. 5, the payload may be encrypted with identifying data of an untrusted computer. After recruiting an untrusted computer, information may be received 502 about the untrusted computer to be placed in the payload such that the untrusted computer may be verified upon delivery of the payload. The payload may be encrypted 504 to prevent tampering and privacy of the stored data in the payload. Instructions may be prepared 506 which identify an external host to contact and deliver the payload. The message may then be created by combining 508 the untrusted instructions and encrypted payload. The message may be marked 510 as valid on a job list or list of valid messages and sent 512 to the untrusted computer. If the encryption key has not been shared, the encryption key may be shared 514 with the proxy fleet to decrypt the payload.

For example, a home user's computer desktop may contact a control plane, which will share identifying information, such as IP address and user agent string. The control plane may combine and encrypt the identifying information of the untrusted computer and a token identifying a job to contact an internal server. Instructions, such as JavaScript instructions, may be created for the untrusted computer to contact a host available on the Internet. The host may be identified by contact information, such as IP address, URL, or hostname. The payload and instructions may be combined in the form of a message, such as a packet or file. The message, payload or identifying information about the message, payload or untrusted computer may be added to a list such that the message may be identified as a currently active message to satisfy a job. The message may then be sent to the untrusted computer. In some cases, it may be desirable to use one or more encryption keys. If the encryption key used has not yet been shared, it may be shared with the proxy fleet to use in decrypting the payload.

In some embodiments, the instructions may include further instructions to perform additional tests. These tests may include latency, hops, bandwidth, routing and transit delays. The results of these tests may be sent with the payload to the proxy fleet. For example, the untrusted computer may be requested to perform a traceroute command and report the results with the payload to the proxy fleet. In another embodiment, the untrusted computer may be requested to send and/or receive a file to test bandwidth and report the start and end time to the proxy fleet.

Figure 6:
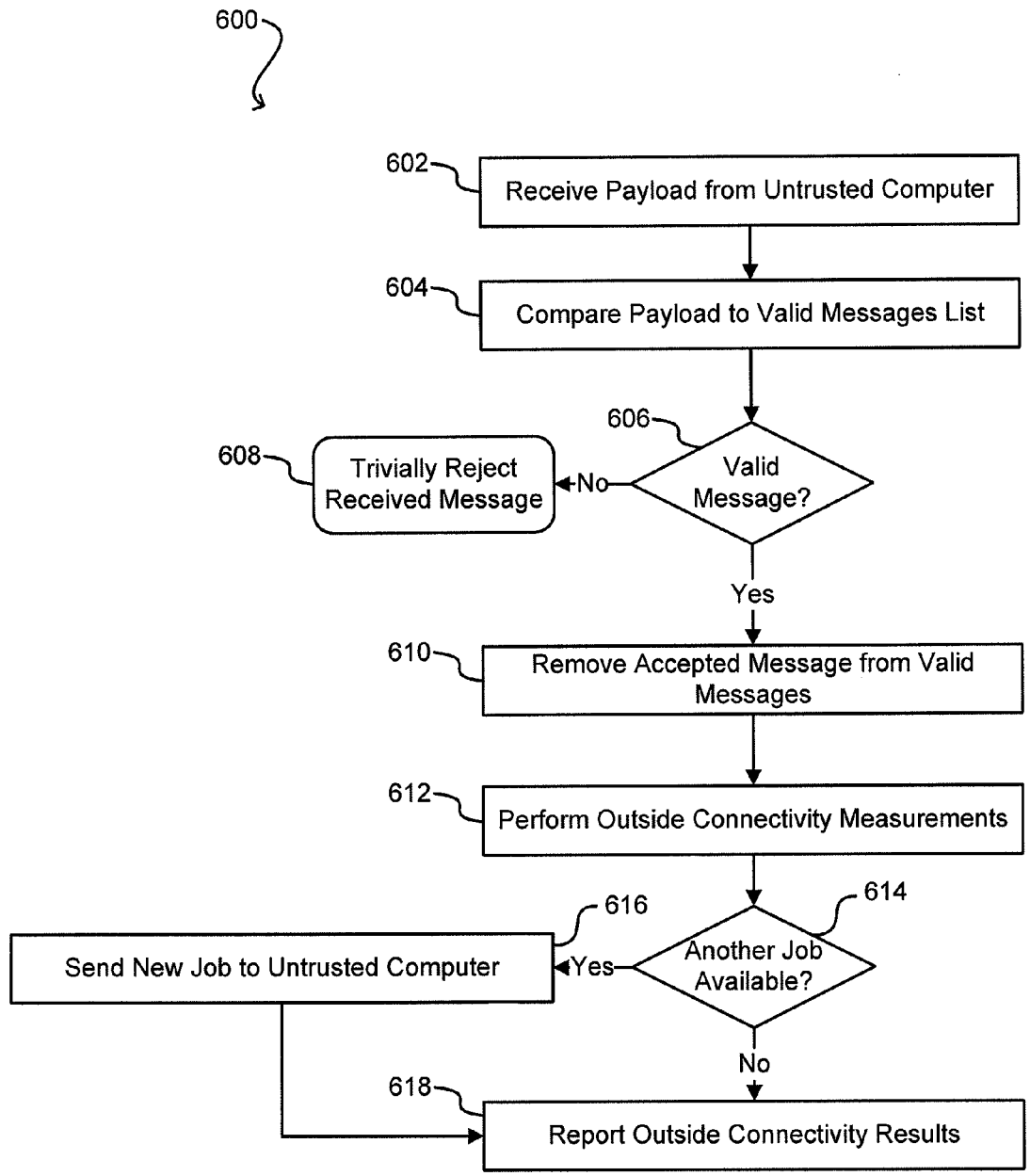
FIG. 6 shows an illustrative example of a process of receiving a message in accordance with at least one embodiment.

After receiving a payload, the untrusted computer may deliver the payload to a member of the proxy fleet. The proxy fleet may be configured to verify the payload and, if valid, interact with the untrusted computer. In one embodiment, as shown in FIG. 6, proxy servers within the proxy fleet may receive and verify the payload before performing internal measurements. A proxy server may receive 602 a payload and measurements from the untrusted computer. The payload may be verified 604 against a list of active messages. If the message is not valid 606, the message will not be in the list and can be rejected 608. If the message is valid 606, the message may be accepted and removed 610 from the active list. The proxy fleet may perform 612 measurements back to the untrusted computer. If another job is available 614 to be sent to the untrusted computer, the proxy server may prepare 616 a new message to send to the untrusted computer. Whether or not the new job is available 614, the results of the external connectivity may be reported 618 to a monitoring system.

For example, a mobile phone may have previously received a message with a payload. The mobile phone may follow any untrusted instructions within the message and deliver any results with the payload to a proxy server. The proxy server may compare the payload with a list of active messages. If the payload does not match active messages, the payload may be rejected. Payloads may also be rejected for other reasons, including timing, duplication, or forgery. For example, a payload may be rejected if the payload has taken too long in delivery and has become inactive. In another example, a payload is rejected because the payload is a duplicate of a previously received payload. In another example, a payload is rejected as forged because the untrusted computer from which the payload was received appears to be different than the original untrusted computer to which the payload was sent. However, if the payload matches a job in a list of active messages, the payload may be accepted along with any results. The message associated with the payload may then be removed from the active message list. Interaction with the mobile phone, such as proxy fleet to mobile phone traceroute measurements, may be performed. If other jobs are available, the proxy fleet may create new messages and tests for the mobile phone to perform. Whether or not new jobs exist, the proxy fleet may report the external connectivity results with the mobile phone to a monitoring system.

Figure 7:
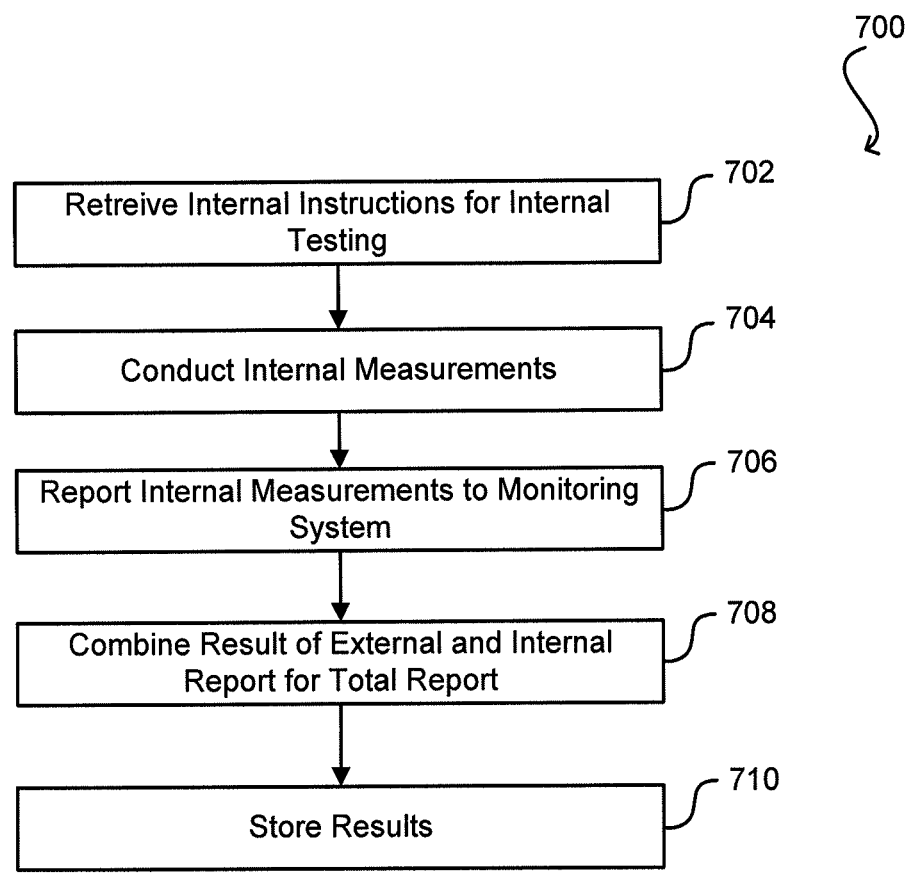
FIG. 7 shows an illustrative example of a process of measuring internal network connectivity in accordance with at least one embodiment.

Having received a valid payload and performed external measurements, the proxy fleet may perform and report internal measurements. In one embodiment, shown in FIG. 7, the proxy fleet may use the payload to determine instructions 702 for the internal host to contact and testing to perform. The tests may be performed 704 on the internal host and results received. The results of the internal tests may be reported 706 to the monitoring system. The monitoring system may combine 708 the external results with the internal results to prepare a total report of Internet to internal server connectivity. The reports may be stored 710 for later retrieval and/or aggregation for other reports.

For example, a proxy server may use the payload to find instructions on the types of tests to be performed on the internal server. The instructions may be included in the payload, may be part of a look-up based on a token within the payload, or pre-selected based on timing or internal server. Once discovered, the internal measurements may be performed, such as traceroute or ping. Results of the test may be reported to a monitoring system, which may aggregate the results to show on a real-time dashboard of an administrator. The results may also be stored for later use.

Instructions and payloads may be sent in conjunction with other services. In one embodiment, as seen in FIG. 8, the instructions and payload may be sent in conjunction with a web page, such as an electronic marketplace 800. The electronic marketplace 800 may be displayed via a web page displayed on a web browser interface 802 on an untrusted computer. The web page illustrated in FIG. 8 includes a result pane 804 on the right-hand side of the web page and a refinement pane 806 on the left-hand side of the web page. While browsing the electronic marketplace, the untrusted computer may be selected to participate in the Internet connectivity testing. Executable instructions, such as JavaScript, HTML, Silverlight, Flash, Java or other instructions, may be inserted into the web page. The instructions may request a payload be sent to the untrusted computer. In some embodiments, the payload may be encoded as an image, such as a logo 810 that appears on the web page. The instructions may request the logo 810 be delivered to the untrusted computer, and upon delivery, relayed to the proxy fleet. In other embodiments, the activity may be more transparent to the user. For example a set of data, such a token, may be transmitted from the control plane through the untrusted computer to the proxy fleet while not being displayed.

An advantage of using a web page is that tasks may be targeted to specific geographic or network locations. For example, if Internet connectivity to India is desired to be measured, the website server may use an untrusted computer's IP address to estimate geographic location. If the untrusted computer's IP address matches, the website server may inform the control plane to include the connectivity measurement instructions. Similarly, by using computers accessing a web page, important customer connectivity may be measured. For example as the electronic marketplace serves up the connectivity test on its web page, it tests the connectivity to live customers. Should connectivity tests fail, administrators may know in near-real time about connectivity problems.

Figure 9:
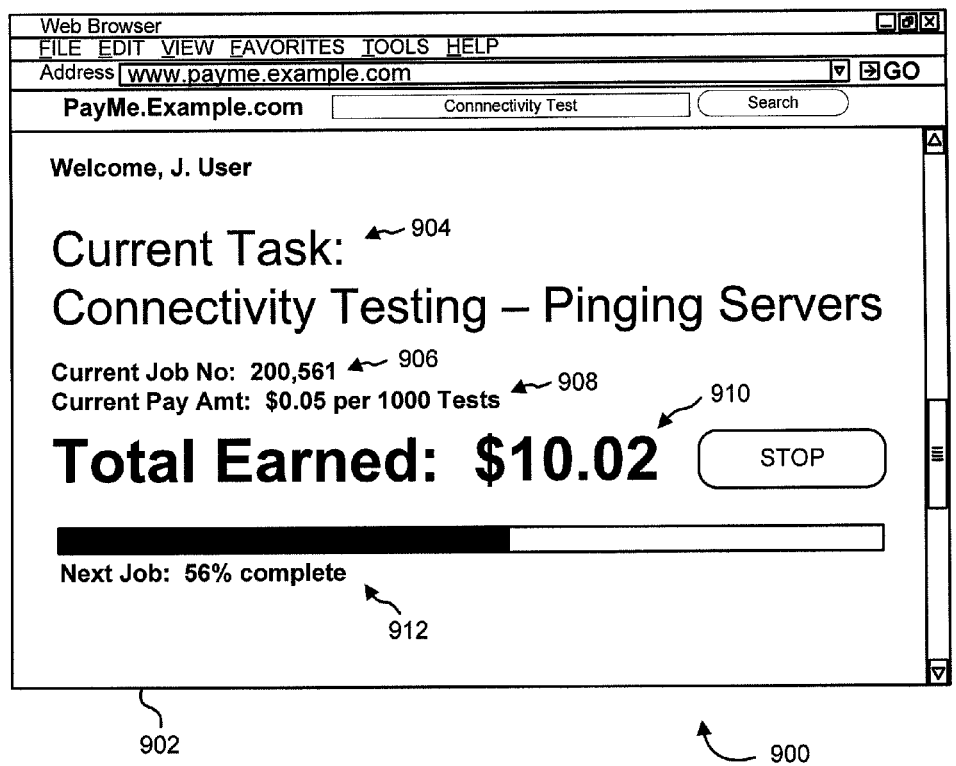
FIG. 9 shows an illustrative example of a service for giving value in exchange for secure Internet connectivity tests in accordance with at least one embodiment.

In another embodiment, an untrusted computer owner may receive payment for testing Internet connectivity. As shown in FIG. 9, a user may navigate to a task service 900 displayed on a web browser interface 902 on an untrusted computer. The web browser interface 902 may display a task name 904, number of jobs completed 906, payment terms 908, total earned so far 910 and job percentage complete 912. The untrusted computer may execute instructions as described in FIGS. 3 to 7. For each set of jobs completed by the untrusted computer, the user may receive payment. By choosing to pay, an administrator may be more selective in the untrusted computer characteristics sought. For example, if an Internet service provider is more desirable because of more accurate measurements, the administrator may require the untrusted computer be serviced by the desired Internet service provider.

For example, an administrator of a data center may choose to set up Internet connectivity tasks in a task marketplace, such as a crowdsourced marketplace. The administrator may prepare an offer on a task marketplace to test Internet connectivity. A user may login and navigate to the offer within the marketplace. Once the user accepts the offer, the user may leave the browser open to the web page and allow the browser to complete assigned tasks. In the embodiment shown in FIG. 9, a user may receive five cents for every task of one thousand Internet connectivity tests performed.

While the above information has been centered on measuring Internet connectivity, it should be recognized that the principles described may apply to other situations. For example, inter-network connectivity may also be measured in a similar manner. In another embodiment, a trusted computer is used on the Internet, such that the connectivity measurements may be trusted, while still protecting from forgeries.

Figure 10:
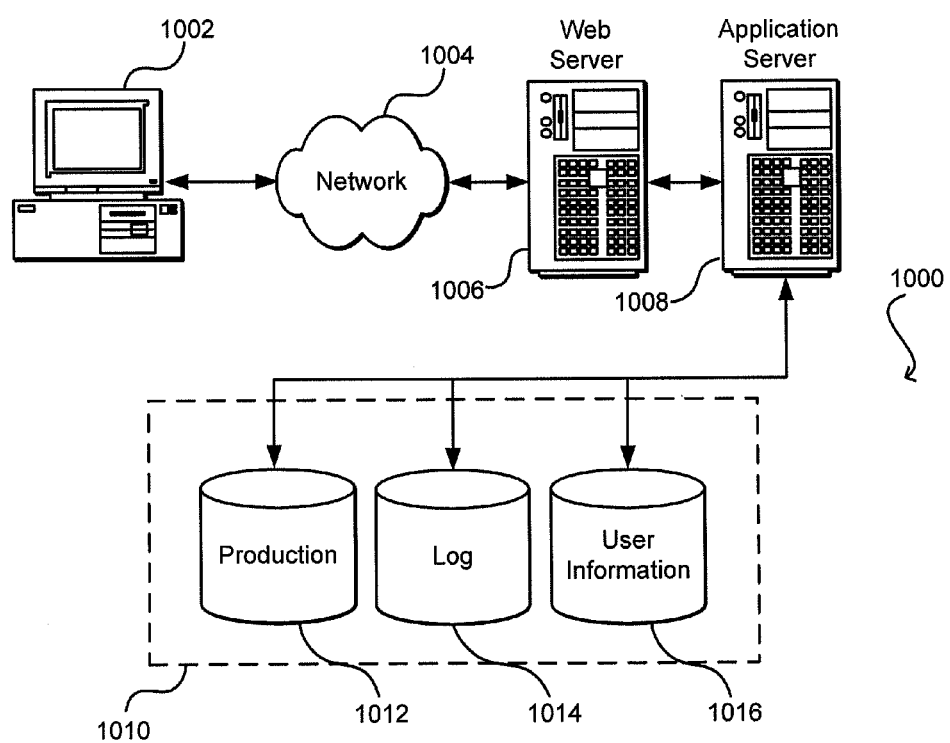
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for providing connectivity monitoring services, comprising:
under control of one or more computer systems configured with executable instructions,
communicating, by the one or more computer systems, a message to an external device on an external network, the message including instructions and a payload, the instructions including information for contacting an externally available server having a hostname that resolves on the external network, the payload having at least an encrypted portion, the payload including contact information for an internal server for which external network connectivity is to be determined, the internal server residing on a secure internal network, the secure internal network having access controls preventing unauthorized access to the internal server from the external device, the externally available server having access to the secure internal network;
receiving, by the externally available server, the payload from the external device;
decrypting, by the one or more computer systems, the encrypted portion of the received payload to determine the internal server to contact;
contacting, by an internal computing system on the secure internal network, the internal server through the secure internal network using the contact information included within the accepted payload;
determining whether a path exists from the external device to the internal server based at least in part on a response from the internal server and the receiving of the payload; and
reporting, by the one or more computer systems to a monitoring system, a result of determining whether the path exists from the external device to the internal server, enabling the monitoring system to aggregate the result.

2. The computer-implemented method of claim 1, further comprising:
referencing a payload from the message as active on a list of active payloads that have yet to be received on the externally available server;
accepting the received payload in response to a determination that the received payload is referenced on the list of active payloads; and
removing the reference to the accepted payload from the list of active payloads.

3. The computer-implemented method of claim 1, further comprising:
receiving a second payload on the externally available server, the second payload having a timestamp; and
rejecting, by the externally available server, the second received payload if a difference between a receiving time of the second payload and the timestamp of the second received payload is beyond a threshold.

4. The computer-implemented method of claim 1, wherein accepting the received payload further includes performing a measurement of at least one of latency, hops, bandwidth, routing or transit delays.

5. The computer-implemented method of claim 1, further comprising:
receiving a second payload on the externally available server, the second payload having an encrypted portion and a digital signature; and
rejecting the second payload by the externally available server, in response to determining that an operation to decrypt the encrypted portion and verify the digital signature failed.

6. A computer-implemented method for providing connectivity monitoring services, comprising:
under control of one or more computer systems configured with executable instructions,
sending a message having forgery-resistant information and instructions to an external computing system on an external network, the instructions directing the external computing system to contact an externally connected host and provide the externally connected host with at least the forgery-resistant information, the forgery-resistant information identifying an internal host on a protected internal network;
receiving, from the external computing system and by the externally connected host, the forgery-resistant information;
contacting the identified internal host through the protected internal network to measure the connectivity of the internal host; and
determining, by the one or more computer systems, a measurement of connectivity to the internal host from the external computing system on an external network based at least in part from a response received from the internal host and the receiving of forgery-resistant information from the external computing system on the external network.

7. The computer-implemented method of claim 6, wherein receiving the forgery-resistant information comprises verifying that the external computing system to which the message was sent is a same external computing system from which the forgery-resistant information was received.

8. The computer-implemented method of claim 6, wherein contacting the internal host is performed by the externally connected host, the externally connected host having a network route to the internal host.

9. The computer-implemented method of claim 6, wherein the instructions comprise multiple contacts with externally available hosts, each contact associated with an instruction to send at least a portion of the forgery-resistant information to at least one of the externally available hosts.

10. The computer-implemented method of claim 6, further comprising:
preparing a list of internal hosts to contact within a period of time based on a policy of determining the network connectivity of internal hosts, the list forming a subset of all internal hosts; and
timing the sending of the message to be sent based at least in part on the list.

11. The computer-implemented method of claim 6, wherein the internal host is selected from a guest operating system, hypervisor, machine, router or application.

12. One or more non-transitory computer-readable storage media having collectively stored thereon executable instructions that, when executed by one or more processors of a computer system, cause the computer system to at least:
prepare, by the computer system, a list of internal hosts to have external network connectivity tested;
communicate a first message having an insecure portion and a secure portion to an external system, the insecure portion having instructions for contacting a bridge host reachable by the external system and delivering the secure portion to the bridge host, the secure portion identifying an internal host unreachable by the external system, the external system being outside of a trusted network;

receive, by the bridge host reachable by the external system, at least the secure portion of the first message from the external system, the bridge host having connectivity outside the trusted network and within the trusted network; and communicate with the internal host through the trusted network, the internal host identified by the received secure portion of the first message received by the bridge host, the internal host response resulting in a measurement of connectivity of the internal host.

13. The one or more non-transitory computer-readable storage media of claim 12, wherein the instruction to prepare a list of internal hosts is performed by a control plane; and wherein the bridge host reachable by the external system is a member of a proxy fleet, the proxy fleet receiving at least a portion of the list of internal hosts.

14. The one or more non-transitory computer-readable storage media of claim 13, wherein one or more members of the proxy fleet create one or more further messages based at least in part on the list of internal hosts, the further messages sent by the proxy fleet to the external system.

15. The one or more non-transitory computer-readable storage media of claim 13, wherein the secure portion of the first message is encrypted, the encryption key being shared by the control plane and the proxy fleet.

16. The one or more non-transitory computer-readable storage media of claim 12, further including instructions that, when executed by one or more processors of a computer system, cause the computer system to at least:

measure a trust level of the external system, the trust level based at least in part on one or more messages received from the external system; and determining one or more connectivity measurements to request of the external system, based at least in part on the trust level.

17. The one or more non-transitory computer-readable storage media of claim 12, wherein the first message is sent by the control plane to the external system.

18. A system for determining Internet connectivity of a host, comprising:

at least one processor; and memory including instructions that, when executed by the at least one processor, cause the system to determine the internet connectivity of a server that causes at least the following to be performed:

sending an information set to an untrusted computing system, the information set including instructions and protected information, the instructions directing the untrusted computing system to send at least the protected information to a trusted computer, the protected information identifying the host to which connectivity should be tested, the protected information protected from being understood outside of the trusted computer, the host residing on a secure network;

receiving, by the trusted computer, at least the protected information from the untrusted computing system outside the secure network; and testing, by the trusted computer, connectivity over the secure network to the host identified in the protected information, the response from the host and the receiving of the protected information determining Internet connectivity of the host.

19. The system of claim 18, wherein the memory further includes instructions that, when executed by the at least one processor, cause the system to perform:

preparing an information set including an identification of the untrusted computing system within the protected information, the identification used during the verifying of the protected information.

20. The system of claim 18, wherein sending the information set to an untrusted computing system includes:

sending a web page to the untrusted computing system;

including instructions within the web page, the instructions directing the untrusted computing system to request the message; and receiving a request from the untrusted computing system for the message to be sent to the untrusted computing system.

21. The system of claim 18, wherein the memory further includes instructions that, when executed by the at least one processor, cause the system to perform:

communicating an offer for payment to a user in exchange for the untrusted computing system successfully completing one or more Internet connectivity tests; and transferring payment to an account associated with the user in response to determining that the protected information was received from the untrusted computing system.

22. The system of claim 18, wherein the memory further includes instructions that, when executed by the at least one processor, cause the system to perform:

sending a confirmation to the untrusted computing system, the confirmation acting to verify that a return path is present to the untrusted computing system from the trusted computer; and receiving an acknowledgement of the confirmation from the untrusted computing system.

23. The system of claim 18, wherein the memory further includes instructions that, when executed by the at least one processor, cause the system to perform:

referencing information that identifies the protected information on a list of active tasks before receiving the protected information by the trusted computer;

removing the reference to the information that identifies the protected information from the list of active tasks after receipt of the protected information; and rejecting, by the trusted computer, other communication of protected information that is not identified on the list of active tasks.

* * * * *